United States Patent

Ballas, Sr.

[11] 4,052,789
[45] Oct. 11, 1977

[54] ROTARY CUTTING ASSEMBLY

[75] Inventor: George Charles Ballas, Sr., Houston, Tex.

[73] Assignee: Weed Eater, Inc., Houston, Tex.

[21] Appl. No.: 747,319

[22] Filed: Dec. 3, 1976

Related U.S. Application Data

[63] Continuation-in-part of Ser. No. 746,685, Dec. 2, 1976.

[51] Int. Cl.² .................. B26B 27/00; A01D 55/18
[52] U.S. Cl. .......................................... 30/276; 56/12.7
[58] Field of Search ................ 30/276, 347; 56/12.7, 56/295; 310/68 D

[56] References Cited

U.S. PATENT DOCUMENTS

| 3,664,102 | 5/1972 | Reber | 56/295 |
| 3,859,776 | 1/1975 | Ballas et al. | 56/12.7 |
| 3,928,911 | 12/1975 | Pittinger | 56/12.7 |

FOREIGN PATENT DOCUMENTS

| 1,281,450 | 12/1961 | France | 30/276 |

Primary Examiner—J. C. Peters

[57] ABSTRACT

Apparatus for cutting, trimming, and edging vegetation, and the like, is provided with a rotatable disc-like head having at least one string-like cutting member removably attached thereto and replaceably extending from its periphery for cutting adjacent vegetation and the like. A pair of knife members for cutting the string are provided, as well as drive means for increasing cutting efficiency.

25 Claims, 22 Drawing Figures

ROTARY CUTTING ASSEMBLY

RELATED APPLICATIONS

This application is a continuation-in-part of copending U.S. patent application Ser. No. 746,685 filed on Dec. 2, 1976.

BACKGROUND OF INVENTION

This invention relates to methods and apparatus for cutting vegetation and the like, and more particularly relates to improved methods and apparatus for cutting vegetation with a flexible non-metallic cord member.

It is well known to cut or mow grass, weeds and other vegetation with a moving flail-like member, and it is now well known to employ a flexible non-metallic cord member for the purpose of cutting vegetation located in places which are inaccessible to apparatus employing a rigid steel blade. In particular, the trimmer which is marketed in various forms under the trademark WEED EATER, and which is described in U.S. Pat. Nos. 3,708,967; 3,826,068; and 3,859,776; is now widely known and used for this purpose.

This invention relates to an improved cutting assembly in the form of a rotary head for a rotary edger, trimmer or the like. The preferred embodiment is in the form of a portable hand-held type mowing and edging tool wherein the cutting element is safe in most uses and avoids the hazardous conditions created by prior art devices.

The prior art is prolix with attempts at solutions to provide a safe, efficient and simply constructed rotary head for rotary mowers, edgers, trimmers and the like. One attempt comprises a rotating metal bar or the like which is rotated at sufficient speeds to effect cutting of grass, weeds or the like. However, such bars create hazardous conditions in that when they strike certain objects they act upon those objects in a fashion to create and project dangerous missiles which may strike the operator or individuals in the area of work.

Various attempts have been made to overcome the aforesaid hazardous conditions created with rigid-type metal cutting blades of the prior art. Most of these attempts to overcome the problem involve the utilization of some type of flexible flail which will have sufficient resiliency so as not to propel objects which are struck at high velocities. Most of these resilient type cutting elements of the prior art suffer a disadvantage in that they are not safe and mere resiliency is not sufficient to insure that the dangerous conditions will not be created when rotation is effected at desired cutting speeds. Further, the prior art cutting elements are generally not provided with means for easy replaceability in the event of wearing out and are usually expensive to replace.

The result has been that most of the prior lawn and edging apparatus have been unsatisfactory because of the dangerous conditions created by the rotating head. As a consequence, most lawn edging and trimming around trees and the like, which would otherwise be damaged by the metal blades, must be done manually, which is both laborious and time consuming.

There is depicted and described in the following Petty West German Pat. Nos. 6,919,841; 6,919,842; 6,919,843; 6,919,844; 6,938,265; 7,043,648 and 7,238,972, one or more embodiments of a lawn mowing or trimming device having a disc-like head member arranged to be rotated by an electric motor, and containing a spool which is housed therein in coaxial relationship to the shaft of the motor. A length of flexible nonmetallic line is coiled about the spool, whereby its free travelling end extends generally peripherally from the spool and head, and whereby such free travelling end will be swung arcuately about upon actuation of the motor to cut adjacent vegetation in the manner of a flail.

Use of the German device has revealed that, under ideal operating conditions, it will cut or trim grass and other light-weight vegetation with reasonable effectiveness. Furthermore, it possesses the significant advantage that it is much safer to use than the more conventional cutters, in that it does not cause stones or other solid objects to be discharged in the same dangerous manner, and it is almost completely incapable of causing any significant injury to persons or pets struck by the flail-like cutting string. In fact, it is a reasonable statement that the German device will actually cut substantially only the vegetation to which it is directed.

On the other hand, the German device is also subject to certain disadvantages of a magnitude such as to severely limit if not destroy its practical value. In the first place, it is largely effective to cut standing light-weight vegetation but is almost completely useless for any other task. In the second place, it will only cut such vegetation if growing relatively sparsely, and it cannot effectively handle even light-weight vegetation if encountered in a rank condition. A more serious disadvantage, however, is that in the German device the cutting string experiences a breakage rate which is so high as to nullify all of its advantages and to keep such a device from having much commercial value.

It will be readily apparent from a consideration of the teachings hereinafter provided that a cutting string which is free from internal flaws or other defects will not usually break except as a result of being struck against or across a relatively immovable object. The cutting string may, of course, be formed of a metal wire or heavy strap in order to provide it with a tensile strength sufficient to resist such impact, but such a string will create substantially the same dangerous conditions which exist when the cutting element is a rigid blade or the like. Thus, the safety advantages which are present with the German device are directly derived from the same design feature which is the reason for excessive string breakage, i.e., the fact that the cutter used by the German device is a light-weight plastic string having a relatively small diameter, and therefore having a relatively poor tensile strength.

These disadvantages of the prior art, and especially the aforementioned German device, are overcome with the present invention, and commercially acceptable embodiments of a vegetation cutter and the like are herein provided which are not only fully capable of cutting vegetation under most operating conditions, but which are also fully capable of other tasks completely beyond the capabilities of the German device, such as cleaning dead leaves, trash and other such debris from along fences, walls and the trunks or stems of trees and bushes. More particularly, however, the embodiments of the present invention are capable of operation with a much higher efficiency and much lower lower breakage rate for their cutting strings.

SUMMARY OF INVENTION

This invention is for an improved cutting assembly for a rotary mower, edger, trimmer or the like. It includes a body member arranged for rotation about an axis generally perpendicular with or normal to the cutting plane. It preferably includes one non-metallic cutting line attached to the body member at three alternate sites for rotation therewith in the cutting plane, although a pair of lines may be effective for present purposes under proper circumstances. More particularly, provision is made via metallic bearing surfaces for the reduction of friction between the cutting lines and portions of the apparatus and between adjacent portions of the cutting lines, and for higher speed and cutting efficiency.

The line is characterized by having an effective working length to diameter ratio, and of a material composition such as to render the line flexible and yielding to the extent that it is substantially incapable of causing damage or injury when impacting against persons, animals, trees, etc. Preferably, the effective working length to diameter ratio of the line is in the order of 82:1. Certain embodiments of the invention include means for detachably securing the line or lines to the body member so that the same may be replaced after wear or breakage resulting from impact of the line against fences, trees, walls, etc., as well as vegetation. Provision is also made within the body member for storing additional cutting line in the nonworking condition whereby the effective working length of the line or lines may be lengthened at desired times as the working length becomes shortened due to breakage or fraying during use thereof. Certain embodiments of the invention may have line storage means supported in the body member, which storage means are in the form of a spool which is locked from rotation, but which may be disengaged whereby additional line may be paid out to replace or replenish the effective working length of the cutting line when it becomes shortened during use. Another particularly significant feature is that the configuration of the cutting head is such as to prevent angular deformation or "kinking" of the cutting line, as will hereinafter be explained in detail.

In one particularly ideal embodiment of the present invention, a circular head member is provided which contains a single spool located concentrically therein in coaxial alignment with the motor shaft, the spool having a single strand centrally wound thereabout so as to present a free travelling end extending from the periphery of the head assembly. Alternatively, in a two exit head embodiment, a pair of two separate strands may be wound about the spool to present two ends as cutting members extending oppositely of each other from the periphery of the head assembly.

It has been discovered that when a three exit head is employed for present purposes, greatly improved balance of the cutting head is achieved when the strand is extended, as compared with two-exit heads. Consequently, in an alternative ideal embodiment of the present invention, a single strand may be wound about the spool to present to three or more exits spaced equal distances around the periphery of the head assembly.

In addition to the various other problems of the devices of the prior art, it has also been discovered that excessive line breakage will occur from another cause not heretofore discussed. As hereinbefore explained, the subject cutting devices operate by revolving the circular cutting head at a relatively high velocity, whereby the cutting lines are caused to be more or less rigidly and radially extended from the periphery of the head. During such revolvement, however, these lines are caused to vibrate longitudinally as well as laterally.

As will hereinafter be explained and described in detail, the uncoiled or free travelling end of the cutting line tends to contact portions of the cutting head such as the walls of the peripheral apertures or "windows" in the rim of the cutting head. When the aforementioned longitudinal vibrations occur, the line tends to rub back and forth against these contact points. Although the surfaces of both the line and the walls of the cutting head are relatively smooth, there is considerably friction nonetheless, and therefore heat is often generated to an extent such that the cutting line tends to melt. When this occurs, the melted portion of the line may adhere to the contacted surface of the head, and thereafter break, or the melting may itself create a weakening of the line whereby it will thereafter break off at that point.

Another important point of friction may be found where the line is wound onto the spool, since the free travelling portion tends to move back and forth all along its length and not merely outwardly from the cutting head. Thus, friction between the portion of the extended line which abuts or lies against the more immovable sections of the line which are coiled about the spool will also given rise to heat and thus melting of the line at these points. When melting of the line occurs here, the softened portion of the cutting line often tends to become welded to the other winding of the line on the spool, whereby breakage will often occur for this reason. Even is adjacent portions of line do not become welded or cemented together, melting of the line will itself create a weakness, and thus a breaking point, as hereinbefore explained.

It is a feature to reduce the friction between the cutting line and any portion of the cutting device against which the cutting line is caused to rub. In a particularly suitable embodiment of the present invention, therefore, such friction is reduced by providing that the nylon cutting lines be disposed against metallic bearing surfaces preferably composed of brass or some other suitable metal or other substance.

It is another feature of this invention to provide for insulation or reduction of friction between adjacent portions of the cutting string itself. In a particularly suitable embodiment of the present invention, the cutting lines are preferably coated with a suitable viscous lubricant such as petroleum jelly or the like, as they are wound onto the spools which are thereafter mounted in the rotatable head. Accordingly, the coated windings are insulated and may be permitted to move back and forth freely against each other without the generating of heat in sufficient quantities to cause melting of the cutting lines. Furthermore, addition of petroleum jelly to the cutting lines is desirable to reduce friction between the cutting lines and bearing surfaces on the cutting head, even when such surfaces are composed of brass or some other appropriate material as hereinbefore described.

It is a further feature of the herein described invention to substantially reduce the up and down deflection of the cutting line in the vicinity of the peripheral apertures, and to keep the line in one fixed cutting plane. In a particularly suitable embodiment of the present invention, therefore, such deflection is reduced by employing bulbous shaped exit apertures wherein the cutting line is forced into the constricted portion by the centrifugal forces caused by rapid head revolution. The bearing surfaces of brass or other suitable metal or other substance hereinbefore described may be suitably shaped and inserted in the said bulbous shaped apertures.

It is another advantageous feature of the present invention to provide maximum operator convenience and ease of operation. Accordingly, the device has been equipped with a two-piece adjustable handle to enable an operator to easily adjust the attitude of the cutting head to various cutting planes, and with a dual-knife assembly for cutting the line to its proper operational length.

In its broadest concept, any type of motor may be employed for purposes of the present invention to rotate either of the aforementioned types of head assemblies. However, an electric motor is cheaper and of lighter weight than a gasoline-driven engine and is therefore far more suitable for a cutting device intended to be employed in residential-size plots or areas, and the like, wherein lesser cutting capabilities are normally required. Accordingly, it is a particular feature to employ an electric motor having characteristics especially suitable for such purposes. For example, electric motors having glass bead filled nylon brushes offer many advantages that motors not so equipped lack. They have higher temperature resistance characteristics, wear better, have lower coefficients of friction, and are better able to withstand heat generated by arcing between brushes and the commutator, and heat generated by the resistance of the windings. Therefore, it is a feature to use an electric motor employing such nylon brushes.

It is yet another feature of the present invention to use a full-wave bridge rectifier in conjunction with the electric motor to greatly increase motor torque, with accompanying greater cutting efficiency, while at the same time only slightly increasing motor RPM. This feature is of great importance because increased motor RPM increases the likelihood of line breakage and is therefore undesirable.

Because electric motors operate at maximum efficiency only when properly ventilated, it is also a feature to provide means for forcing air to circulate about the electric motor herein. It is a feature to provide air inlet holes sufficiently far away from the motor and the grass cutting operation that grass cuttings or other debris is not drawn into the air inlet holes.

These and other features and advantages of the present invention will become apparent from the following detailed description, wherein reference is made to the figures in the accompanying drawings.

DETAILED DESCRIPTION

Figures 1, 2:
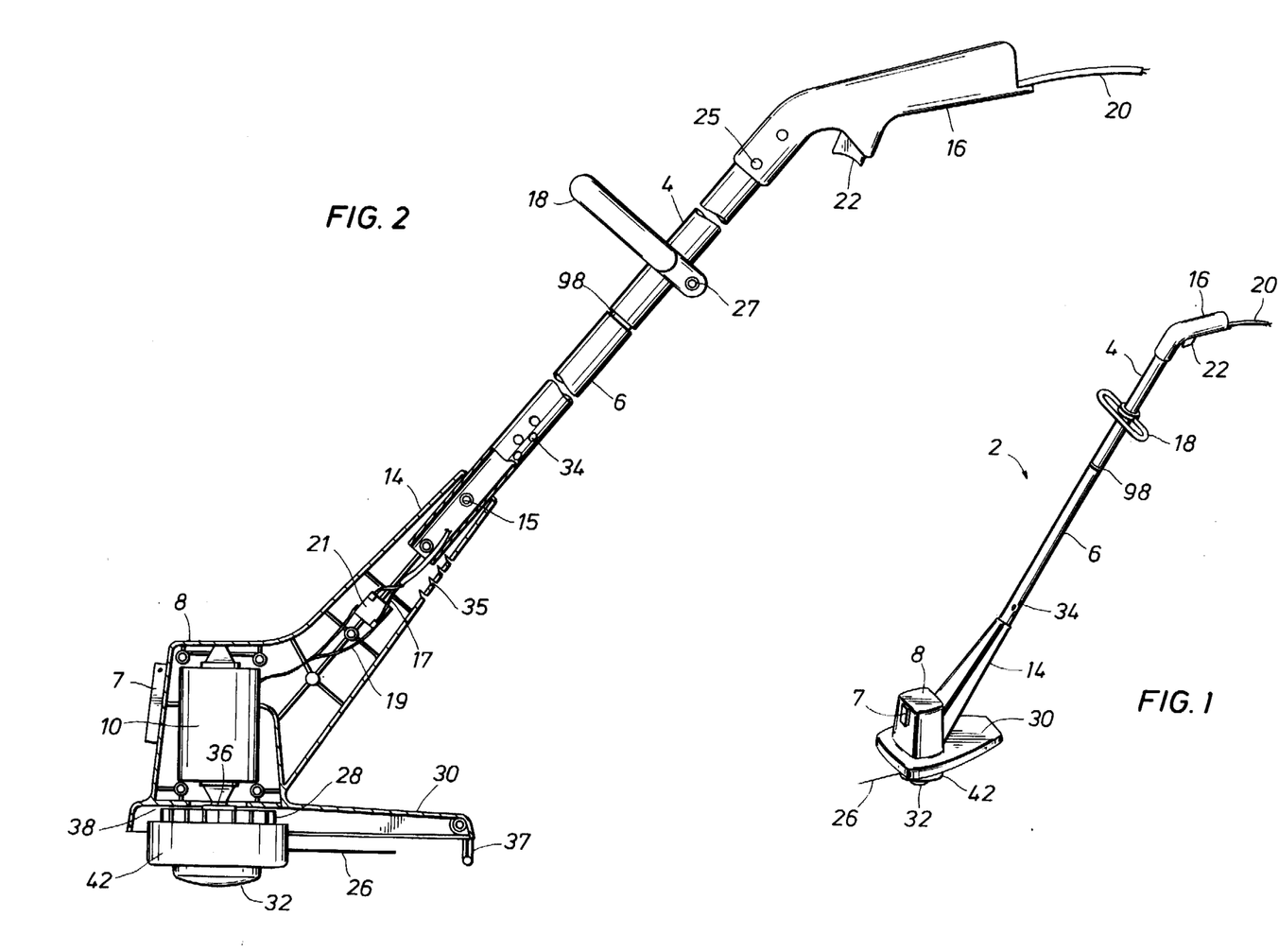
FIG. 1 is a pictorial view showing the entire cutting apparatus.
FIG. 2 is a pictorial side view, partly in cross-section, of the apparatus depicted in FIG. 1, wherein the mechanical features and configuration of the apparatus are set forth in greater detail.

Referring now to FIGS. 1 - 2, a portable type mowing and edging device generally designated by the numeral 2 is shown, and which is of the type preferred for lighter tasks in residential-size plots or areas, and the like, where electrical power is immediately and conveniently available to the operator. Accordingly, the apparatus may be composed of a two-piece adjustable tubular member 4 and 6 having a casing 8 containing electric motor 10 mounted at one end, which motor drives a string cutting head 42. The tubular member 6 is removably attached to and supports casing 8 by screws 15 insertable in shank 14. Such a device 2 is portable and is hand held and manipulated by an operator by means of trigger handle 16 and intermediate handle 18. Handle 16 is attached to tubular member 4 by screws 25, whereas handle 18 is attached to tubular member 4 by an easily adjustable wing-nut assembly 27. Power may be applied to the motor 10 through a conventional electrical-type insulated cord or conductor 20, having an appropriate plug at one end (not shown), and having its other end passed through the tubular members 4 and 6 for connection with the motor 10 by means of connectors 17 and 19 at contacts of a full-wave bridge rectifier 21. An appropriate ON-OFF switch or trigger 22 may conveniently be located adjacent the handle 16 at the upper end of the tubular member 4, for interconnection with the conductor 20 and motor 10. The cutting plane of the cutting string 26 may be easily arranged in either a horizontal or vertical position (FIGS. 14 and 15) or tilted to any angle, to cut along sidewalks, around trees and rocks, and along fences and the like, where it is either unsafe or difficult to cut with conventional apparatus, merely by turning and manipulating handles 16 and 18. Additionally, an attitude adjustment mechanism 98 may be provided to enable tube member 6 to telescopically, rotatably and incrementally lock with respect to the tube member 4, wherein an operator may adjust the attitude of the cutting head in relation to the ground, as will be described in more detail hereafter with regard to FIGS. 16 and 17.

Referring more particularly to FIG. 2, there may be seen a larger and more detailed pictorial representation of the apparatus depicted more generally in FIG. 1. More particularly, the apparatus or vegetation cutter 2 depicted therein may be seen to include a hollow casing 8 or the like, with a single string circular cutting head 42 which is rotated by the shaft 36 of an electrical motor 10 of suitable design mounted within casing 8. Casing 8 also carries a manually operable knife 7 for cutting strand 26 to length prior to operation of the device. This cutting knife 7 will be described in more detail hereinafter with reference to FIGS. 18 – 20.

The cutting head 42 may be further seen to include cutting strand 26 extending laterally from the cutting head 42 through either aperture 60 or 62 (FIG. 3) of suitable configuration, a distance which is a function of the present invention as will hereinafter be explained. As further indicated, the casing may have an oval or tear-dropped shaped interference guard or shield member 30 which mounts at one end thereof a stationary cutting blade 37 described in more detail hereinafter with reference to FIGS. 21 and 22. The interference member prevents the cutting head 42 from being brought into injurious contact with a wall or tree during its rotation by motor 10.

When the motor 10 is inactivated and the rotary head 42 is in a static condition, the cutting strand line 26 will tend to flexibly dangle from one of the equally spaced-apart windows 60 and 62 (FIG. 3) to the extent permitted by inherent characteristics of line 26. When the cutting head 42 is rotated at normal operating velocities, however, the line 26 will tend to stand out rigidly (but also flexibly and yieldably) from the periphery of the cutting head 42 as indicated in FIGS. 1 and 2.

As will hereinafter be explained in greater detail, a spool containing surplus line is removably insertable into cutting head 42, and held in place by glide ball 32. In addition to securing the spool in place, glide ball 32 allows the device to be operated, if desired, without having to be continually and solely supported by an operator. The device 2 may be rested and propelled forward on the glide ball 32 when in operation if this type of cutting is found to be desirable. Generally the unit is supported by the operator at handles 16 and 18.

The electric motor 10 operates in an optimum manner when the air around it is allowed to be circulated or otherwise cooled. The hollow casing 8 effectively allows air to freely circulate around motor 10, therefore providing forced air circulation. The plurality of upstanding fins 28 located on the top of cutting head 42 and extending radially outward from the axis thereof provide forced circulation of air about motor 10 when motor 10 rotates head 42. Rapid rotation of head 42, and hence of fins 28, causes said fins to create a low pressure zone within casing 8, whereby air is drawn from the atmosphere through either openings 34 in lower tubular member 6 or through slots 35 in shank 14, and passed through shank 14, casing 8, and around the motor 10, and expelled through the space 38 between shield 30 and cutting head 42. This circulation of air sufficiently cools motor 10 to provide maximum efficiency and minimal ambient heat rise. Moreover, the openings 34 and slots 35 are sufficiently removed from the cutting area that cut grass or other debris flung up by line 26 is not likely to enter openings 34 and slots 35 along with the air.

As hereinbefore stated and further depicted in FIG. 2, the ideal embodiment of this invention features a permanent magnet electric motor 10. The fundamental concept of a permanent magnet motor assumes the presence of a first electromagnetic field, which is generated by the magnet (or magnets) and which is therefore fixed both as to intensity and position, and a second electromagnetic field which is generated by a winding rotatably positioned in the first field. The intensity of the second field is functionally related to the magnitude of the amperage, the AC current which energizes the winding, and since the actual amount of amperage in any AC current at any given time is a function of its frequency, it will be apparent that the intensity of the second field is a function of the frequency of the AC current as well.

The amount of force required to rotate the winding is a function corresponding to the product of a constant and quantity which, in turn, may be stated as a fraction wherein the numerator is the product of the intensities of the two fields, and wherein the denominator is the distance between attracting poles of the fields. Initially this force is at a maximum, not only because the distance between the two attracting poles is at a maximum, but also because of inertia. Thus, the winding will draw a maximum current flow to effect initial rotation. Since the frequency of the energizing AC current is fixed, however, it will be apparent that, after the winding begins to rotate, the distance between the poles will tend to decrease as each pulse of current arrives at the winding. This, in turn, not only tends to accelerate rotation of the rotor or armature of the motor, but it also tends to decrease the amount of current required by the winding to effect such rotation. Accordingly, the difference between the intensities of the two fields is greatest upon start-up, but this difference decreases thereafter until the intensity of the field generated by the winding approximates the intensity of the field generated by the permanent magnets in a motor of this type such as depicted generally in FIG. 2 at 10.

The intensities of these two fields will nver become exactly equal, of course, since a sufficient difference must continue to exist to overcome the effect of friction. However, it will be apparent that the amount of current required by the winding under these conditions will be a function of this difference, and that the amount of current being drawn by the winding will be smallest when the difference in intensities are at a minimum.

As hereinbefore stated, the intensity of the second field is also a function of the frequency of the energizing current. It will be apparent that since the amperage rises and falls in the winding as a function of the sinusoidal configuration of the AC input current, and since it is the rise of such amperage which produces the turning force on the winding, the winding will tend to accelerate in rotational velocity as the amperage rises in it. Since the amperage also follows a sinusoidal pattern of rise and fall, and since a reversal of polarity in the winding would oppose its rotation, it is conventional to rectify input AC current so as to eliminate all "negative" pulses. Decrease in amperage does not retard acceleration of the winding, of course, provided it does not effect a reverse of polarity, but it does not assist acceleration. Accordingly, it will be apparent that acceleration of the winding, and a decrease in the distance between the poles, will continue until a time factor is achieved which corresponds to the peak of the current pulses. At this point, a state of equilibrium is achieved which is commonly referred to as the "terminal velocity" of the motor.

It will be apparent at this point, that the current required to maintain this equilibrium is now stabilized at a minimum value, and that the force required to effect rotation of the winding at "terminal velocity" is also at a minimum, as long as the other parameters (amperage, frequency, load on the motor, etc.) are maintained as constants. It will further be apparent, that if the frequency of the input current is increased, the time factor will also change so as to further decrease the distance which exists between attracting poles upon the occurence of each current pulse. The motor will then increase its RPM until this new higher "terminal velocity" is achieved. It should also be noted, however, that this increase in velocity is accompanied by a proporitonal decrease in the amount of current required by the winding.

Referring again to the force being required to turn the winding, it should be noted that the amount of force (or torque) being delivered by the motor shaft 36 is inversely proportional to the force required to turn the rotatable winding. Thus, the delivered torque is smallest upon initial actuation of the motor, and is greatest when the motor achieves "terminal velocity." Furthermore, it will be apparent that an increase in the frequency of the current energizing the rotatable winding will produce an increase in delivered torque which is far out of proportion to the increase in current required by the motor.

As hereinbefore stated, it is conventional for AC current to be rectified before being applied to a permanent magnet motor, in order to eliminate all pulses of unwanted polarity. It will be apparent that such "half-wave" rectification results in elimination of half of all of the current pulses composing the AC power signal available, but this is not deemed significantly detrimental in most applications wherein simplicity and economy of design is of paramount importance. Accordingly, so-called "full-wave" rectification is not generally used except in those instances wherein a maximum terminal velocity is desired and, in those instances, it is usually if not always preferable to employ a motor having windings in lieu of permanent magnets, and to employ instead a commutator so as to eliminate all need for rectification of the AC signal.

It has heretofore been conventional to power cord-type vegetation cutters with permanent magnet motors because of their higher torque capabilities as compared with solenoid-type motors of the same size. It has also heretofore been conventional to employ only half-wave rectification in permanent magnet motors used with vegetation cutters, since full-wave rectification does not produce a significantly higher terminal velocity for these motors, and since a substantial increase in RPM will tend to produce string breakage at an unacceptably high rate of frequency. What has not heretofore been recognized, however, is that a small increase in terminal velocity for a motor will produce a disproportionately large increase in delivered torque. Cutting effectiveness of any cord-type cutter is directly proportional to the magnitude of impact being delivered against the vegetation by the tip of the revolving cord. The amount of this tip impact or tip energy is directly proportional to the delivered torque of the motor shaft, and since full-wave rectification produces a substantial increase in the torque delivered by the motor shaft, it will be apparent that full-wave rectification (as at 21 in FIG. 2) of the input AC to the motor will greatly enhance the cutting effectiveness of such apparatus.

This increase in delivered torque has overall significance to the operation of cord-type vegetation cutters for another reason. Cutting effectiveness is a function of cord diameter as well as motor RPM, and since full-wave bridge rectification produces a large increase in delivered torque without a proportionately large increase in motor RPM, the cutting effectiveness of the trimmer apparatus is increased without an unacceptable increase in the breakage rate of the cutting spring. Moreover, this increase in delivered torque also permits the use of cutting lines of larger diameter which, in turn, not only further increases the impact and therefore the cutting effectiveness of the apparatus, but also further reduces the frequency of string breakage. Note also that, since the terminal velocity of the motor is increased, albeit only moderately, the foregoing advantages are attained with only an insignificant increase in the power requirements of this equipment.

The cutting line 26 may be composed of a variety of suitable materials as, for example, an elastoplastic extrusion which has been stretched to align the molecules axially. An example of such line is a nylon monofilament of the type commonly used for fishing line. However, other lines may be used, as for example, yarn, cord, rope, twine, braided line, or monofilament, whether described as elastoplastic, elastomeric, natural fiber, or synthetic fiber, and whether compounded of several materials. Nevertheless, there are certain parameters within which the lines must fall in order to be effective.

The cutting line 26 should preferably have sufficient fatigue, abrasion, impact resistance, and tensile strength to allow a reasonable service life, and should have as small a diameter as is consistent with the foregoing parameters so that the sharpest cutting edge is provided for effecting cutting of the grass, weeds, or the like. The line 26 should further preferably be as light-weight as possible, so that when the line shears or breaks during use and pieces are thrown from the cutting head 42, such pieces will travel only a limited distance and will strike persons or other objects in the immediate vicinity with little or no appreciable impact.

Cutting may be achieved with line 26 formed of a metal material, and such lines may have a greater tensile strength than if formed of nylon or the like. Metallic lines are more subject to breakage because of fatigue, however, and the relatively greater mass of a piece of metal cutting line will cause it to travel like a projectile for a considerable distance if breakage occurs. In addition to this dangerous feature, the fact that the greater mass of a metallic line requires a larger, heavier motor 10 of greater power makes the use of metallic line 26 undesirable for present purposes. On the other hand, the relatively small mass of a line formed, for example, of an extruded nylon monofilament, creates complex design problems which must be effectively solved to achieve effective cutting of lush vegetation, and this will become even more apparent when it is recognized that only the last one full inch or so of the line 26 actually impacts against the vegetation sought to be cut.

In view of the above, and in further regard to the theory of the invention, it should be understood that in a rotating system as above described, the tip impact has been found to be a function of the mass of the tip of the flexible line member 26 and the tip velocity thereof. This tip impact parameter has been found useful in determining the effectiveness of the cut produced when using the disclosed type cutting device. Thus, it has been found that the higher the tip impact, the better and more effective the cut. Conversely, as the tip impact decreases, due to variation of one of tip mass and tip velocity, the quality and effectiveness of the cut likewise is lowered.

In order to understand the relationship of tip impact being a function of tip mass and tip velocity, each of the latter two must be considered separately as will be set forth hereinafter.

Thus, it has been determined that tip mass is a function of the mean cross-sectional diameter of the line member 26 and the mass of the material of construction of said line member. Since it is contemplated, as above set forth, to construct the line member of a material such as nylon, it will be apparent that this light-weight type of material will possess a very small mass. Thus, in its relationship to tip mass, the mass of the material of the line member will be negligible. Therefore, it will be readily seen that the primary factor determining tip mass is the mean cross-sectional diameter of the line member. Hence, when speaking in terms of tip mass, it should be clear that this term is considered to include primarily the mean cross-sectional diameter of the line member and with little or no emphasis upon the mass of the material of which the line member is made.

As hereinbefore explained, tip impact is a function of tip mass and tip velocity, tip mass being essentially the mean cross-sectional diameter of the line member. Considering tip velocity, it has been found that this feature of the tip impact is a function of each of the following four parameters:

1. the mean cross-sectional diameter of the line member,
2. the length of the line member,
3. the diameter of the head 42, and
4. the RPM of the motor shaft.

A variation of any one or more of the above four factors will obviously vary the tip velocity, and therefore vary the tip impact feature. Thus, tip velocity will change as the diameter of the line member 26 is increased or decreased, as the line member is shortened or lenghened, as the size of the head is increased or decreased, and as the speed of the motor 10 is raised or lowered. In order to understand how each of these factors affects tip velocity, it is necessary to consider each one in its relationship to the other and in its function in the particular vegetation cutting environment.

Referring to the mean cross-sectional diameter of the line member, this factor has been found to have an effect upon tip velocity due to a phenomenon known as "windage." Thus, as the line member 26 is rotated it encounters the resistance of air. It will be apparent that the resistance of air to the passage of the rotating line member causes a drag on the line member. Hence, the greater the diameter of the line member, the greater is the drag. Conversely, smaller diameter line members create less drag. Thus, variation of the diameter of the line member varies the "windage" or drag factor, which in turn varies the tip velocity, thereby changing the tip impact.

With reference to the length of the line member, this factor contributes in some degree to the windage phenomenon noted above. Thus, a given length of line member of a specified cross-sectional diameter will encounter the resistance of air as it is rotated. The resultant drag on the given length of line member will remain constant as the length of line member 26 remains the same. If, however, the line length is increased, a greater drag factor is produced. If, on the other hand, the length of line is decreased, drag is reduced, tip velocity is increased, and tip impact is improved, resulting in a better cut. It should, in addition, be noted that the relationship between the length of the line member and its cross-sectional diameter contribute to the windage or drag factor. Thus, to minimize windage or drag, it should be apparent that a line member of the shortest effective length and the smallest effective mean cross-sectional diameter be employed. These minimum requirements present the least amount of surface area subject to the resistance of air during rotation, and therefore create the least amount of drag.

In addition to drag, the length of the line member 26 also has an additional effect upon tip velocity, partially due to the nature of the line member itself. Thus, under normal operating conditions, the line member will be extended outwardly in a more or less straight fashion, thereby utilizing its total actual length. This is due to the centrifugal force generated upon rotation of the line member, which force acts to straighten out the flexible line member. However, if during the operation of the device, the resistances of the air and/or grass against the line member 26 are sufficient to overcome the centrifugal force tending to straighten out the flexible line along its axial length, the line member at its outermost portion will tend to trail behind that portion of the line member attached to the head 42. This trailing effect is due to the flexible nature of the line member itself, as well as to the resistances encountered. Needless to say, any trailing of the tip portion of the line member behind the portion of the line attached to the head, reduces the effective overall length of the line member, thereby reducing the tip velocity which in turn reduces tip impact. In rather extreme cases of trailing, the lag of the tip of the line member will be such as to provide an arcuate shape to the line member 26 rather than a substantially straight line extension as is desired.

Referring now to the head diameter factor and its relationship to tip velocity, it should be understood that the head 42 supports a portion of the line member. Thus, to theoretically determine the exact length of the line member factor, the radius of the head must be taken into account. For practical purposes, therefore, line length is actually the length of exposed line, that is, the length of line measured from the circumference of the head to the tip of the line member, plus a distance equal to the radius of the head. Obviously, a change in the size of the head 42 will therefore affect the tip velocity due to its contributing a radial length to the line member itself.

In addition to line member length affect, head diameter affects tip velocity due to its mass. For example, assuming identical materials of construction of the head, it will be apparent that a head 42 of large diameter will of necessity weigh more than a head of small diameter. Since mass constitutes a load on the motor 10, any variation of mass of the head will vary the motor load which, in turn, will vary tip velocity and tip impact. Therefore, it should be apparent that the selection of the materials of construction of the head and the particular head diameter selected are important factors in arriving at an assembly for effectively and efficiently cutting vegetation.

Considering the RPM of the motor shaft 36 and its effect upon tip velocity and, therefore, tip impact, it should be noted that any decrease in RPM will reduce tip velocity. Conversely, a better tip velocity is achieved as RPM increases. Primarily of concern is the RPM decrease and the factors contributing thereto. Given a preselected motor design of specific RPM rating, it will be apparent that this particular RPM rating may be decreased by variation in system design. Thus, any change in the load on the motor shaft will affect RPM. For example, an increase in mass will decrease the RPM. A larger diameter head, of greater mass, will put a greater load on the shaft, thereby affecting RPM. A line member 26 of greater length and/or greater mean cross-sectional diameter will also add mass to the system and therefore increase the load on the motor shaft, thus affecting RPM and tip velocity and impact, but to a lesser extent. Another load factor on the motor shaft tending to affect RPM is the result of windage or drag. As set forth above, this resistance phenomenon is a function of the length of the line member and the cross-sectional diameter of same. Thus, to maintain a minimum of drag results in a substantially lessened effect upon load, thereby reducing drag as a factor in RPM variation. With reference to the trailing effect of the line member as noted above, it should be understood that the RPM of the motor shaft must be sufficient to impart enough of a centrifugal force to the line member to maintain the line member in a substantially straight line relationship rather than the somewhat arcuate shaped configuration produced when resistances are encountered.

It should therefore be apparent, that numerous factors and interrelationships therebetween are involved in arriving at an effective and efficient vegetation cutting assembly of the flexible line member type. The design parameters and selection of same are complex since many are dependent one upon the other, and therefore critical. Thus, it will be seen that more is involved herein than just merely rotating a flexible string.

In light of the above, and in order to further exemplify the concepts and features of the present invention, the following four tests were conducted in the manner set forth below and with the following results:

EXAMPLE I

The above described cutting apparatus, with motor 10 but with the cutting head member 42 removed, was tested to determine torque and amperage. The unit was tested at 68° – 70° F., and a cooling fan was used to dissipate heat generated by the motor. The motor 10 was equipped with a thermocouple to monitor heat rise, and at no time during the testing was the heat rise of the motor allowed to exceed 50° C. The unit was tested for torque at different RPMs on a Dynameter Magtrol, 0–100 inch ounces, having a 0–25,000 tachometer for measuring torque. Amperage was measured with an Amprobe RS-3 unit. The RPM developed was monitored by a Tach Lite Strobe Model 832 with photocell pickup. The following table sets forth the pertinent data resulting from this static test:

| RPM | AMPS | TORQUE (INCH-OUNCES) |
|---|---|---|
| 5,000 | 6.5 | 100 |

-continued

| RPM | AMPS | TORQUE (INCH-OUNCES) |
|---|---|---|
| 6,000 | 6.1 | 86 |
| 7,000 | 4.8 | 58 |
| 8,000 | 3.4 | 32 |
| 9,000 | 2.8 | 28 |

EXAMPLE II

The cutting apparatus of Example I was equipped with a cutting head member 42 and static tested to determine the free running speed and the torque of the head turning with the cutting line 26 extended from the head. Again, the RPM was monitored by a Tach Lite Strobe Model 832 with photocell pickup. Torque was determined as above on the Dynameter Magtrol unit. Results of this test are set forth as follows:

| Parameter | Units | Results |
|---|---|---|
| Cord Length | Inches | 5.3 |
| Cutting Diameter | Inches | 15 |
| Torque | Inch Ounces | 58 |
| Tip Velocity | Ft./min. | 27,475 |
| Amperes | Amps. | 5.0 |
| Head Diameter | Inches | 4.4 |
| Cord Diameter | Av./Inches | .065 |
| RPM | Rev./min. | 7,000 |

EXAMPLE III

The cutting apparatus of Example II was further tested to determine the effect, if any, that the cutting of grass would have on the speed of the motor 10. The unit 2 was swung into about three inches of Saint Augustine grass and moved therethrough at a rate of about 2.0 ft.sec. The cutting line 26 was strobed as above to determine RPM. No noticeable drop in the RPM was noted during the duration of this test. Factors which normally affect RPM and tip velocity also had no noticeable effect. Thus, the type of grass being cut, the thickness of the grass, the moisture content thereof, and the speed of the cut did not contribute to any appreciable drop in the RPM.

EXAMPLE IV

The cutting apparatus of Example II was further tested in its comparison with a typical unit as described in U.S. Pat. No. 3,859,776. Both units were operated under the same conditions and tested for parameters as listed in the chart below. Comparative results of the two units are set forth and the percentage increase of the unit of the present invention over that set forth in the aforementioned U.S. Pat. No. 3,859,776.

| Parameter | Device of Present Invention | Device of U.S. Pat. No. 3,859,776 | Percentage Increase |
|---|---|---|---|
| Torque | 50 Inch Ounces | 37 Inch Ounces | 26 |
| RMP | 6,800 – 7,000 | 6,200 – 6,500 | 9 |
| Current Input Motor | 4 amps | 3 amps | 25 |
| Efficiency (Watts In) (Watts Out) | 61% | 38% | 38 |

The improved results shown above have been partially attributed to the device of the present invention because of the presence therein of the full-wave bridge rectifier 21, the changed material from which the brush holders are formed which provides better heat deflection characteristics, and the modified air passageways 34 and 35 which provide improved cooling of the motor 10 with the result that internal heat generation is reduced.

As hereinbefore mentioned, the cutting effectiveness is a function of the weight of the line 26 as well as its tip velocity, and thus, it has been determined that in the preferred embodiment of the present invention, as depicted in FIGS. 1 - 9, the line will be formed of a material having a specific gravity of not substantially less than 0.90 nor substantially greater than 1.60 and preferably 1.18. Since cutting is effected by substantially only the last half inch or so of the line, it may be stated that the line should be a dimension such that the cutting portion of line 26 has a kinetic energy of not substantially less than 0.03 foot-lbs., nor substantially more than 7.14 foot-lbs., when the equipment is in operation. Using the Kinetic Energy formula:

$$KE = \tfrac{1}{2} mv^2$$

Wherein $m$ is the mass of the last $\tfrac{1}{2}$ inch of a 0.065 inch diameter cutting line of 1.18 gm/cm$^3$ density, and wherein $v$ is the tip velocity of 27,475 ft./min., the kinetic energy computed is found to be 0.224 foot-lbs., which is clearly within the parameters of 0.03 - 7.14 foot-lbs. hereinbefore set forth.

Referring now to FIGS. 3 - 9, it may be seen that the lower end of the drive shaft 36 from motor 10 is arranged for threading engagement with a drive adapter or attachment member 36A. Drive adapter 36A extends downwardly through head 42 and is arranged at its lower extremity for threading arrangement with glide ball 32. Drive adapter 36A inserts tightly into head 42 and retains its relationship with head 42 by means of its hexagonal head 40 which is insertable into head 42. Rotation of drive adapter 36A by drive shaft 36 causes head 42 to rotate, thereby extending the string 26 to perform a cutting function.

Figure 4:
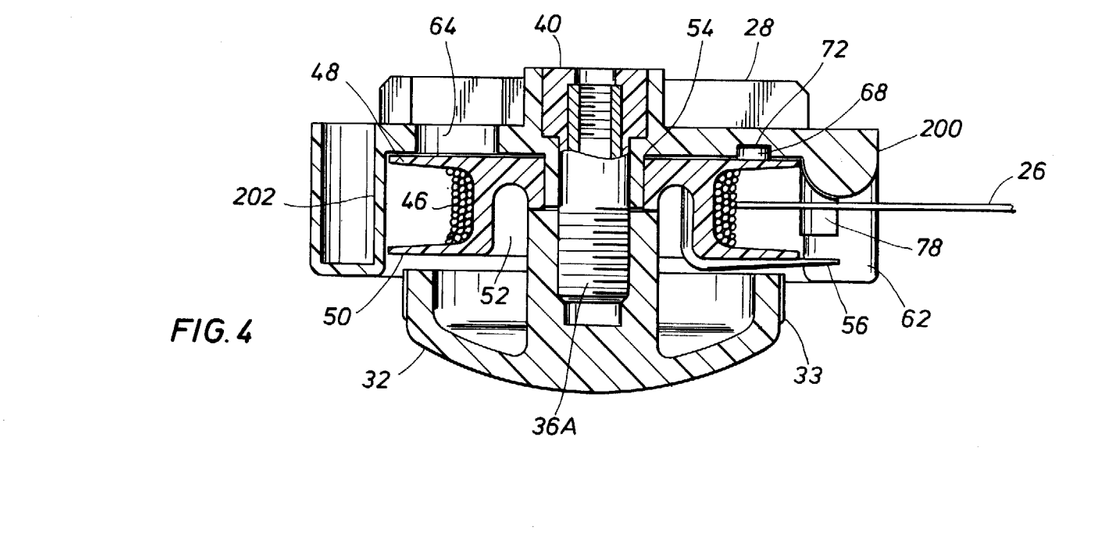
FIG. 4 is a cross-sectional view of the head assembly depicted in FIG. 3 in a static or nonrotating position showing the cutting string mounted therein.
Figure 7:
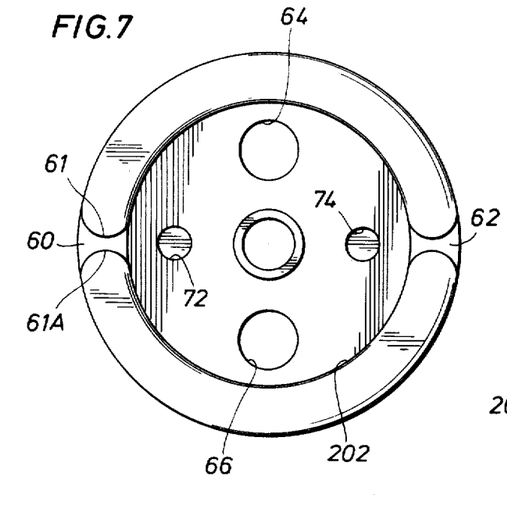
FIG. 7 is a bottom view of the head depicted in FIG. 3.
Figure 8:
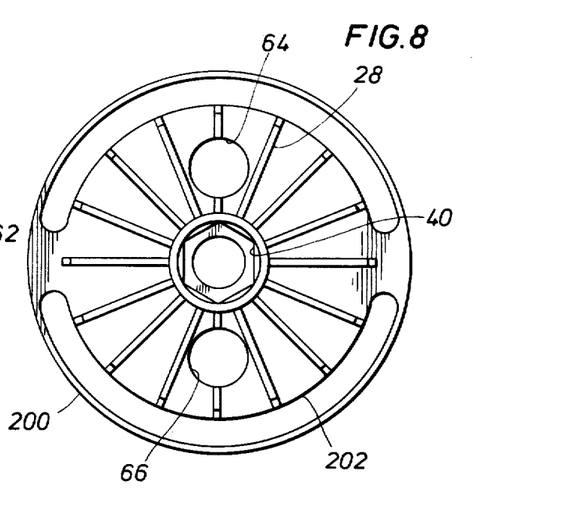
FIG. 8 is a top view of the head depicted in FIG. 3.
Figure 9:
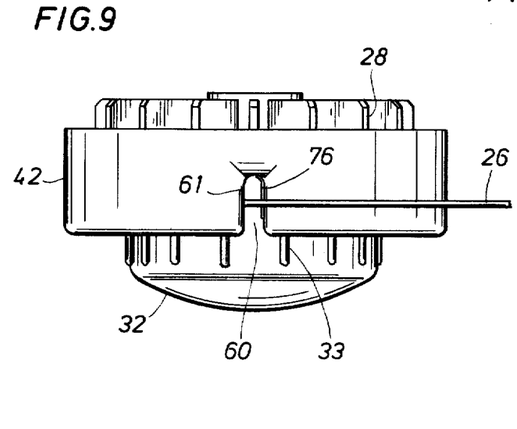
FIG. 9 is a side view of the vaned head in a static or nonrotating position.

Glide ball 32, in addition to engaging drive adapter 36A and securing said drive adapter 36A in relationship with head 42 so as to provide axial rotation thereof, also releasably secures spool 44 within head 42 as shown in FIG. 4. Spool contains spare cutting line 46 therein, which is arranged for paying out at predetermined times and at predetermined lengths to vary the effective working length of the cutting line 26. Removal of glide ball 32 by unthreading from drive adapter 36A allows removal of spool 44 so that a fresh full spool may be reinserted into head 42, or alternatively spool 44 may be rewound with new replacement line, or the like. The external circumference of glide ball 32 may be provided with equally spaced-apart vertical lineal protrusions 33 to insure a better grip for easier removal. Holes 64 and 66 as seen in FIGS. 7 and 8 are provided in head 42 so that after guide glide ball 32 is removed from drive adapter 36A, spool 44 may be more easily removed from head 42 by pressing manually with a finger or other object through the holes 64 and 66 to thereby force the spool 44 to disengage from head 42.

Figure 3:
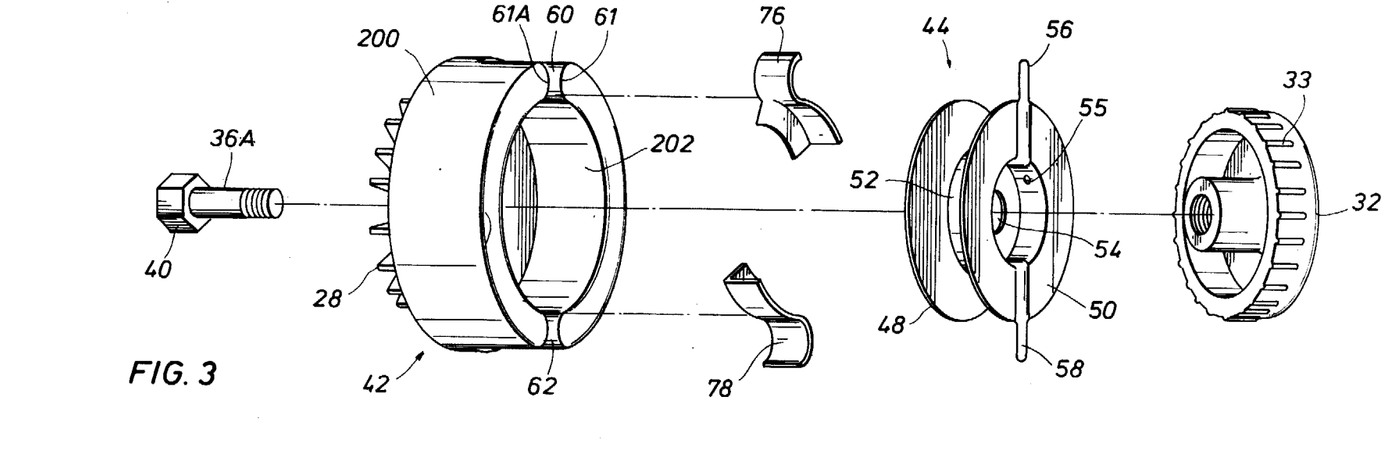
FIG. 3 is an exploded assembly drawing of one embodiment of the head and spool assembly.
Figure 5:
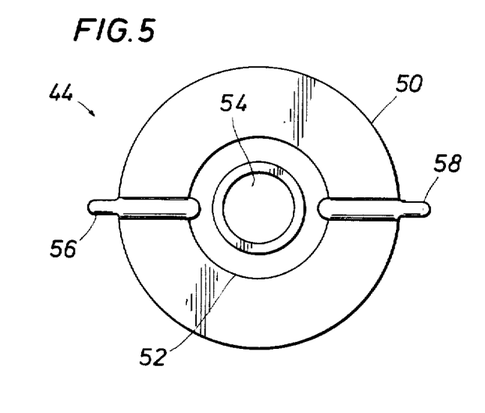
FIG. 5 is a bottom view of the spool assembly depicted in FIG. 3.
Figure 6:
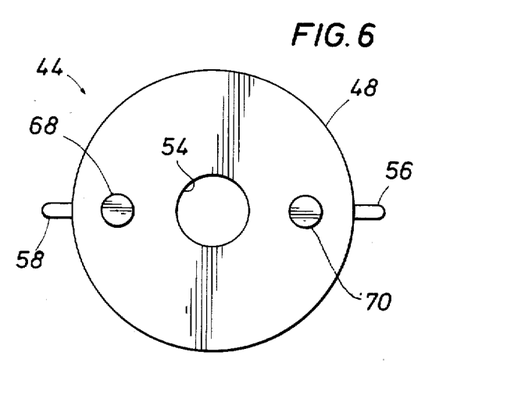
FIG. 6 is a top view of the spool depicted in FIG. 3.

Spool 44 as seen in FIGS. 3, 5, and 6 is composed of a bottom wall 48 and a top wall 50 spaced a predetermined distance by annular hub 52. Interior of hub 52 is an aperture 54 in wall 48 through which drive adapter 36A passes when threaded into glide ball 32. The spool top wall 50 has inert knobs or ridge members 56 and 58 which correspond to and insert knobs or ridge members 56 and 58 which correspond to and insert into window apertures 60 and 62 in head 42 when spool 44 is placed within head 42. Knobs 56 and 58 position spool 44 and close or seal off the bottom of window apertures 60 and 62, whereby the cutting line 26 is effectively prevented from being deflected vertically as will hereinafter be more fully explained. The spool bottom wall 48 is provided with cylindrical alignment protuberance tabs 68 and 70 extending downwardly therefrom. When the spool 44 is placed within head 42, the tabs 68 and 70 harmoniously insert into corresponding cylindrical depressions or detents 72 and 74 in head 42 as seen in FIG. 7, thereby positioning and further securing spool 44 therein for rotation along with head assembly 42.

Figures 12, 13:
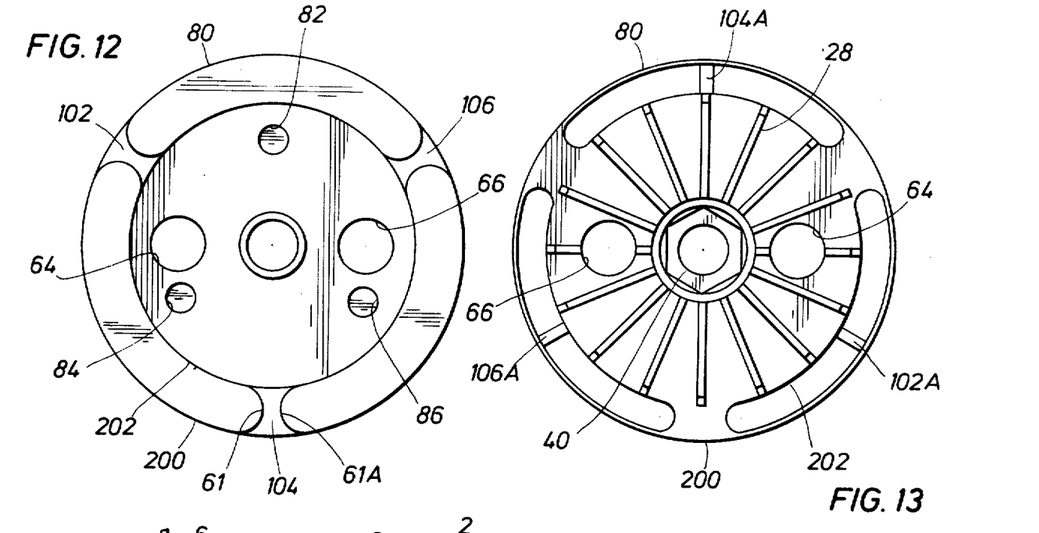
FIG. 12 is an alternate three windowed embodiment of the apparatus depicted in FIG. 7.
FIG. 13 is an alternate three windowed embodiment of the apparatus depicted in FIG. 8.

Referring now to FIGS. 12 and 13, there may be seen a top and bottom view of another embodiment of the present invention. In particular, the depicted head 80 may be seen to be generally similar to the head 42 illustrated in FIGS. 3, 7, 8, and 9. The principal difference, however, may be seen to be the fact that, in the head 42 previously described, the head is preferably provided with two window apertures 60 and 62 wherefrom a cutting string may protrude. The head depicted in FIGS. 12 and 13, however, is preferably provided with three window apertures 102, 104, and 106 equally spaced-apart around the circumference of head 80, from either of which a cutting string may be extended. It can readily be seen that use of the threewindow aperture head 80 requires modification of spool 44. More particularly, use of head 80 requires that three insert knobs 56, 57 and 58, be located on spool top wall 50 as illustrated for example in FIG. 21, so that the three knobs may correspond to and insert into window aperture 102, 104 and 106. In addition, the spool bottom wall 48 is modified to provide three cylindrical alignment protrusions extending therefrom, similar to the protrusions 68 and 70 of FIG. 6 hereinbefore described which protrusions harmoniously insert into the corresponding cylindrical depressions 82, 84 and 86 of FIG. 12.

It may be clearly seen in FIGS. 2–4, that in one embodiment a single line 26 extends from the body of the cutting head 42, and through one of the two window apertures 60 and 62. In the embodiment therein depicted, one end of the line 26 is inserted through aperture 55 in the spool hub 52, and then knotted together to prevent disengagement therefrom. The line 26 is then preferably wound about the spool 44, oppositely of the direction of rotation of spool 44 and head 42, and then extended through one of respective window apertures 60 and 62, as hereinbefore stated.

The line 26 may be unwound and paid out from the spool 44 without moving the spool 44 from the head 42, by drawing it from one of the respective window apertures 60 and 62 and simply pulling down on the line 26 to the next window aperture. This movement of line 26 from aperture to aperture is made possible by virtue of the fact that the top wall 50 of the spool 44 is stiff but resilient. It is to be noted, that a spool modified as hereinbefore described for use with the embodiment of the cutting head depicted in FIGS. 12 and 13, may be similarly wound and unwound with cutting line. In an alternate embodiment of the present invention, a pair of cutting lines 26 may be provided but no additional structure is required to provide this dual cutting line feature. For example, and in light of FIGS. 3 and 4, the empty spool 44 is wound as above. However, in the dual cutting line embodiment, the line 26 is first doubled along its length thereby providing two free ends. That portion of the line that is doubled is inserted through aperture 55 and knotted as above. The doubled line is then wound onto the spool until the two free travelling ends are reached. Each free end of the line 26 is then extended through one of the respective window apertures 60 and 62, thus providing a head assembly 42 including a pair of cutting strands 26. To extend either of the lines, it is then merely required to pull down on the line as seen in FIG. 4 until that line reaches the next window aperture. Since wall 50 is resilient, the line can be pulled along the space defined by wall 50 and the inner periphery of head 42 until it reaches the next window aperture. The other line may be extended or paid out in similar fashion. While two cutting lines may similarly be provided in the three exit head arrangement depicted in FIGS. 12, 13 and 21, use of plural lines is not considered altogether desirable in this particular embodiment since no two of the exit window apertures 102, 104 and 106, are diametrically opposed one to the other. The use of three cutting lines, however, in this particular embodiment is contemplated, although a single line 26 has been found to be entirely sufficient for the majority of purposes to which this apparatus is put to use in vegetation cutting operations.

It has further been determined that the extended length of the cutting line is also a direct function of the size of the cutting head, although the precise explanation for this is not immediately apparent. In any event, it can be stated that this provides that the cutting line 26 should have a free traveling or unsupported length of not substantially less than 0.50 times the diameter of the cutting head, nor substantially more than 2.2 times such diameter, and this appears to be especially significant in the operation of the embodiment of the invention depicted herein.

As hereinbefore explained, it is a feature of the present invention to provide against excessive string or line breakage by substantially reducing vibration between the surface of the cutting line 26 and other objects such as the bearing portions of the rotary head, or adjacent surfaces of the cutting line itself. Referring now to FIG. 3, the two window apertures 60 and 62 are each composed of a pair of curvilinear and spaced apart sidewalls 61 and 61A. In this embodiment of the present invention, the cutting line 26 is composed of a coiled portion 46 (FIG. 4) wound about the spool 44, and a free travelling end portion extending along a tangent thereto outwardly through one of the respective window apertures 60 and 62. Accordingly, the line tends to abut the trailing one of the pair of sidewalls 61 and 61A composing the respective one of the two windows 60 and 62, rather than the sidewall which leads the line as it is carried arcuately about by rotation of the cutting head 42.

As also hereinbefore explained, the cutting line 26 tends to vibrate longitudinally as the cutting head 42 is rotated, and thus oscillate laterally against the trailing sidewall of one of the windows 60 and 62 in a manner to generate sufficient localized heat to at least partially melt the cutting line at a point along its length where it contacts the said trailing sidewall. The window insert knobs 56 and 58 aid in minimizing such rubber by tending to hold the line immobile at these points, but such holding effort as may be exerted by the inserts 56 and 58 must of necessity be limited so as not to restrict the ease whereby new lengths of the cutting line may be paid out as desired.

It has been found beneficial, therefore, to provide these trailing sidewalls with metallic bearing element inserts 76 and 78 preferably formed of a material which has a reduced tendency to develop friction from engagement with the vibrating cutting line, and further preferably having a smooth or polished surface by carrying the cutting line. These inserts 76 and 78 may be formed of a variety of different materials which are suitable for such purposes, but it has been found that a polished metal such as brass or stainless steel is especially suitable.

It should be noted, of course, that if the rotary body 42 is itself formed of brass or stainless steel or the like, or if at least that portion of the rotary head 42 which constitutes each trailing sidewall 61 is formed of such material, then there is no need for the inserts 76 and 78 as seperate components in the cutting head 42. For various reasons hereinafter described in greater detail, however, it is highly desirable to form the rotary head 42 and other major components out of a high impact plastic such as nylon or the like, and although such a material may be provided with sidewalls 61 and 61A having a smooth high gloss finish or surface, a nylon-to-nylon vibratory engagement tends nonetheless to develop heat to an extent much above the melting point of nylon. Thus, it is preferable to form the rotary head 42 of plastic and to eliminate nylon-to-nylon contact by providing metal bearing inserts 76 and 78 as heretofore explained.

It has been determined through usage of the present invention that wherever metal-to-plastic contact can be established at such points of vibratory engagement, reduction or dissipation of unwanted heat is usually if not always sufficient to eliminate melting or softening of the cutting line in the manner hereinbefore described. This, of course, is not a practical remedy in those instances wherein vibratory engagement occurs at places such as between adjacent windings of the cutting line 46 (FIG. 4). On the other hand, application of a coating of suitable lubricant to the cutting line 46 will not only overcome this problem completely but will also further reduce vibratory engagement and insulate those points wherein metal-to-plastic contact has also been achieved by means of the aforementioned inserts 76 and 78 or the equivalent.

As hereinbefore stated, any of several materials may be employed as a heat insulating lubricant for this purpose, and as also previously stated, common petroleum jelly has been found to be entirely satisfactory. Any of many other substances of suitable viscosity may be employed as a lubricant, however, provided such lubricant will adhere to the surface of the cutting line 46 whereby the entire line is adequately coated at all times.

Figure 10:
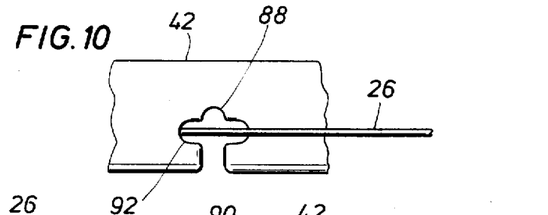
FIG. 10 is a partial side view representation of one embodiment of a cutting string aperture.
Figure 11:
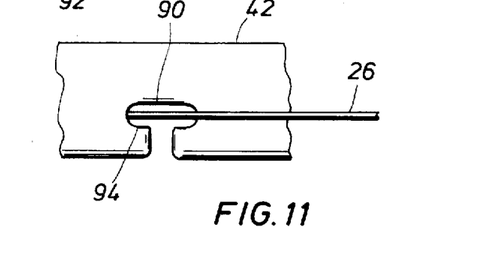
FIG. 11 is a similar partial side view representation of another embodiment of a cutting string aperture.

Referring now to FIGS. 10 and 11, it may be seen that the windows 60 and 62 of FIG. 3 may be altered in design so as to provide bulbous shaped apertures 88 or 90 as shown, or any other similarly shaped aperture. Rapid revolution of head 42 will force cutting line 26 into constricted portions 92 or 94, thereby reducing the up and down deflection of the cutting line 26 in the vicinity of the windows 88 or 90 as hereinbefore discussed. Furthermore, the bearing inserts 76 and 78 (FIG. 3) as hereinbefore described may be suitably shaped and inserted into the bulbous windows 88 or 90. It is to be noted that the alternate embodiment of the head 80 depicted in FIGS. 12, 13 and 21, may likewise employ bulbons window configurations 88 or 90 disclosed herein.

Figures 14, 15, 16, 17:
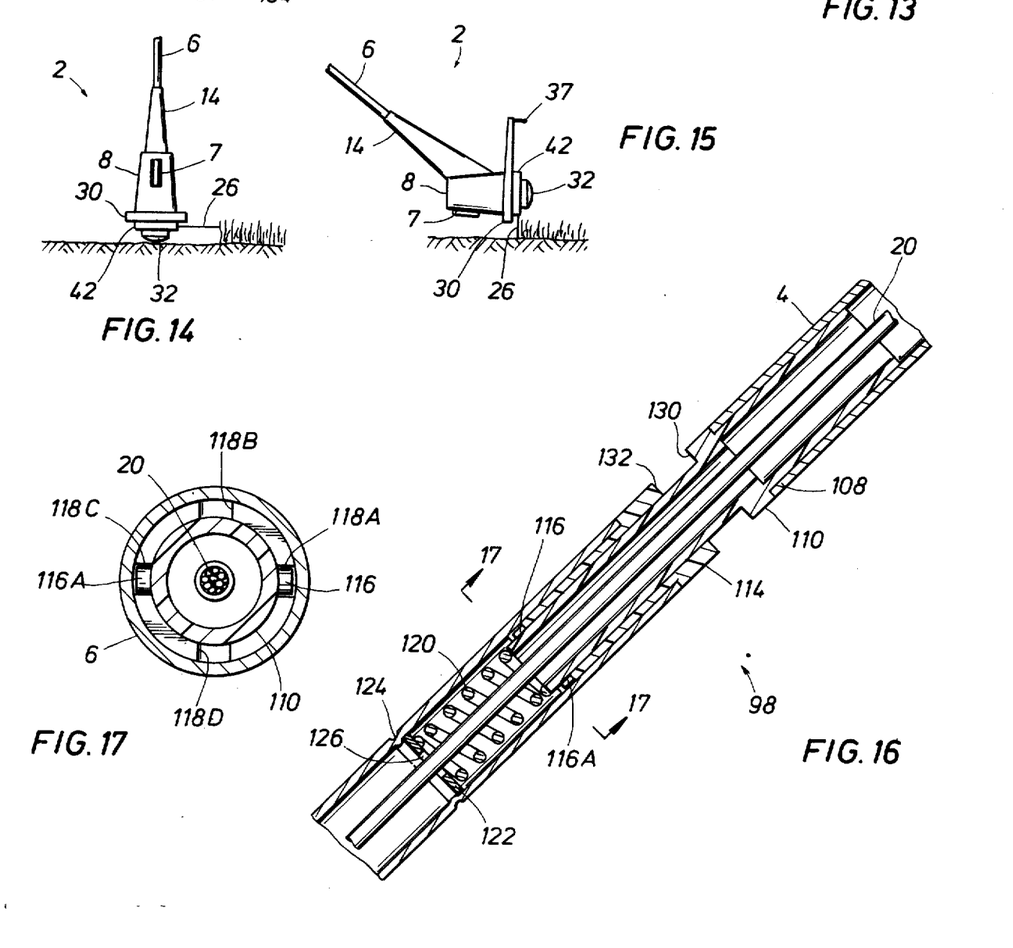
FIG. 14 is a partial view showing the portable apparatus being used to cut grass or weeds in the upright level position.
FIG. 15 is a similar partial view showing the apparatus being used to cut in the perpendicular or sideways position.
FIG. 16 is a partial cross-sectional view of the handle of the apparatus showing the attitude-adjusting mechanism for positioning of the cutting head as shown in FIGS. 14 and 15.
FIG. 17 is a cross-sectional view taken along line 17—17 of FIG. 16 showing the attitude-adjusting mechanism of the handle of the apparatus.

Referring now to FIGS. 14 and 15, two positions or attitudes for operating the device 2 are depicted. FIG. 14 shows a partial view of device 2 being operated in a horizontal position with the cutting path described by cutting line 26 being essentially parallel to the ground. The lower portion of the tubular member 6 is shown supporting casing 8 by means of shank 14. Cutting head 42 is shown with cutting line 26 extending therefrom. In actual practice, much of the grass or weeds to be cut will be close to the ground, and therefore the device 2 will have to be tilted slightly to cause the cutting string 26 to cut. In this regard, glide ball 32 may be used to allow the unit to "ride" the ground as the cutting operation takes place, and the convex outer lower shape of the glide ball 32 enables an operator to conveniently tilt the unit 2 to any desired angle.

Referring more particularly to FIG. 15, the unit 2 depicted in FIG. 14 is shown in the alternate vertical attitude. The device 2 may be used in this attitude to trim areas otherwise not accessible, trim in a straight line by "trenching" a grass plot in the conventional manner, or the like.

Proper manual manipulation of handles 16 and 18 (FIG. 2) of apparatus 2 may result in either a horizontal or vertical cutting attitude as hereinbefore described and depicted in FIGS. 14 and 15. However, attitude adjusting means 98 as shown in FIG. 16 may be incorporated between upper and lower tubular members 4 and 6, respectively, to facilitate attitude adjustment by allowing tubular members 4 and 6 to be axially rotated and telescopically arranged with respect to each other in increments of 90°.

Referring more particularly to FIGS. 16 and 17, upper tubular member 4 is shown terminating at its lower end 108 in a tubular insert 110 suitably permanently affixed thereto. Inserts 110 and 114 are axially aligned, and insert 110 extends beyond member 4 and inserts snugly but slidably into insert 114. Near the lower extremity of slidable insert 110 and affixed thereto are two protruding knobs 116 and 116A, rectangular in cross-section, and releasably retained by slots 118A - D, whereby insert 110 may be rotated axially within insert 114. Spring 120 is axially aligned and contained within tubular member 6 between insert 110 and washer 122. Washer 122 retains spring 120 in place, and is itself retained in position by a crimp 124 in the circumference of tubular member 6. Electrical harness assembly 20 may be seen extending substantially through the center of aperture 126 in washer 122, and further through the axial center of spring 120, then through the axial centers of inserts 110 and 114, and finally through the axial centers of tubular members 4 and 6. Thus, it will be apparent that downward pressure in the axial direction on upper tubular member 4 and hence on insert 110, sufficient to overcome the upward bias exerted by spring 120, will cause tubular members 4 and 6 to converge and telescope until annular surfaces 130 and 132 contact. Knobs 116 and 116A will then be forced downwardly sufficiently to be disengaged from slots 118A and 118C. In this compressed mode, tubular members 4 and 6 may be axially rotated in opposite directions sufficient to rotate knobs 116 and 116A 90° within member 6 and align them with slots 118B and 118D. Removal of the downward pressure will cause spring 120 to force insert 110 and member 4 upward again and to slide knobs 116 and 116A into slots 118B and 118D. In this manner, tubular member 4 may be rotated in 90° increments with respect to tubular member 6, thereby enabling an operator to choose between a horizontal (FIG. 14) or vertical (FIG. 15) cutting attitude while retaining handles 16 and 18 in the same convenient easy to hold position shown in FIGS. 1 and 2.

With reference again to FIGS. 12 and 13, a further feature of the present invention includes means whereby the three exit head embodiment may be balanced rotationally so as not to transmit unwanted vibrations to the motor shaft 36. Thus, to provide a smooth running and rotationally balanced head assembly 80, it is necessary to offset the weight attributable to the line 26 extending outwardly of one of window apertures 102, 104, 106. If, for example, as depicted in FIG. 12, a single cutting line passes outwardly of the periphery of head 80 via aperture 102, the mass of the peripherally extending portion of the line 26 will unbalance the head 80 in a rotational sense. Thus, the head at point 102 will include a mass that is not offset by a corresponding mass at a location diametrically opposite point 102. To overcome this deficiency, and with reference to FIG. 13, there will be seen three balancing ribs 102A, 104A, and 106A. Each balancing rib is located diametrically opposite its corresponding window aperture. Thus, for example, balancing rib 104A balances window aperture 104. When the head 80 is assembled for grass cutting operation and includes therein a full spool of line 26, the line is inserted into one of apertures 102, 104, 106. The line extends outwardly of one of these apertures and acts as a flail to cut vegetation. Normally, a five to six inch length of line 26 is used for cutting operations. However, as noted above, it is this section of line that causes head 80 to rotate in an otherwise unbalanced condition. It is therefore the function of the balancing ribs to offset this mass of the five or six inch flail. This is accomplished by constructing the balancing ribs of an amount of material equal in weight to the mass of the extended flail section of line member 26. This weight of the balancing rib will vary from unit to unit depending, of course, upon variable factors such as line diameter, line density, length of the flail portion of the line, and the particular materials of construction of the head 80, cutting line 26, and balancing ribs 102A, 104A, and 106A. Sufficient to say, however, that the balancing ribs have a mass equal or substantially equal to the mass of the extended cutting flail portion of line 26.

The curvilinear line bearing surface 61 and 61A of each of window apertures 102, 104, 106, is preferably formed by constructing the head member 80 of a pair of spaced-apart walls 200 and 202 as seen in FIGS. 12 and 13. Thus, wall 200 defines the outer periphery of head member 80, whereas wall 202 defines the inner periphery thereof. It will be seen that in FIG. 13, the balancing ribs 102A, 104A, and 106A, are placed between walls 200 and 202 and are positioned radially with respect to the axis of rotation of the head or housing member 80. As illustrated in FIG. 13, the space between walls 200 and 202 is otherwise open. It should be noted, that the two exit head embodiment of FIGS. 7 and 8 is likewise of double-walled construction as hereinbefore explained with reference to FIGS. 12 and 13.

Figure 18:
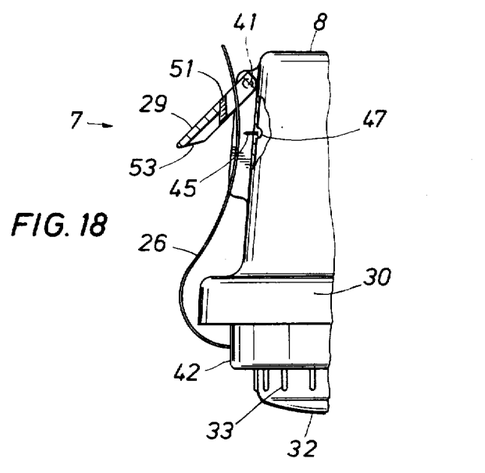
FIGS. 18 and 19 are partial side views of the housing of the apparatus of FIG. 2 and showing details of a knife assembly for the manual cutting of the line member.
Figure 19:
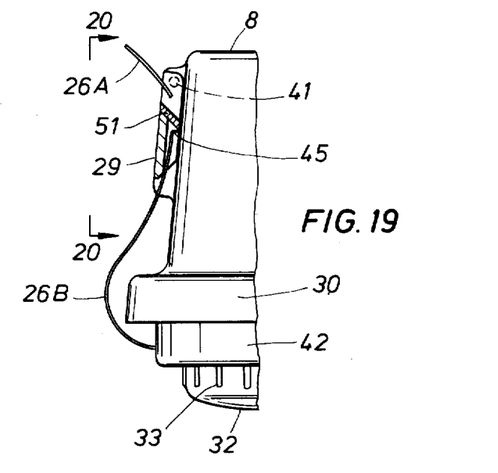
Figure 20:
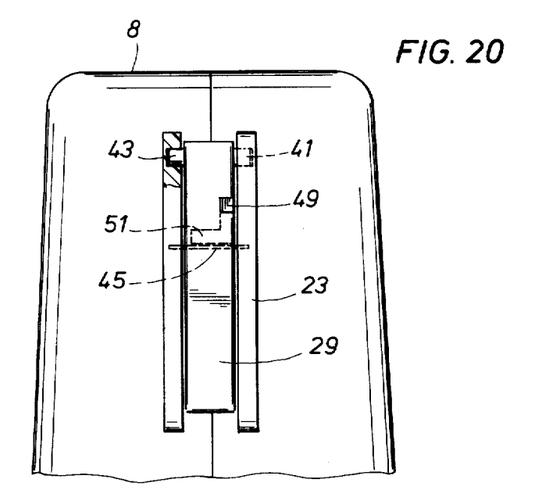
FIG. 20 is a partial front view of the knife assembly of FIG. 19 and taken along the line 20—20 thereof.

Referring now to FIGS. 18 - 20, and more particularly to FIG. 18, there is therein depicted an embodiment of the present invention featuring a manually operated knife assembly or cutting mechanism 7 which functions to cut the line member 26 to approximately the desired length prior to the startup of a vegetation cutting operation. Thus, the knife assembly 7 is attached and carried by housing 8 and is located thereon at a position above the head member 42 and vertically spaced above the cutting plane. The knife assembly is positioned a predetermined distance above the cutting plane so that operation of the knife 7 to pre-cut line 26 results in a line length of approximately 5-6 inches. Thus, the function of knife assembly 7 is to enable the operator to cut the line 26 to approximately its desired effective cutting length prior to the grass cutting operation. The line 26 will be cut to the exact length desired by the automatic knife assembly 37 during actual operation of the device, which will be described hereinafter with reference to FIGS. 21 and 22.

Referring now to FIG. 20, the knife assembly 7 will be seen to comprise a pair of spaced-apart and parallel mounting flanges 23 and 24, fixed to housing 8 or molded integrally therewith. Pivotally mounted within flanges 23 and 24 is a movable pressure block 29 carried by pins 41 and 43. As seen in FIGS. 18 and 19, the pins 41 and 43 provide for pivoted movement of the pressure block 29 towards and away from housing 8. Thus, in FIG. 18, the pressure block 29 is moved away from housing 8 to receive the section 26 of the line member to be cut, while in FIG. 19, the pressure block 29 is shown in it position after the cutting of line 26 to a predetermined length has been completed.

As seen in FIG. 18, housing 8 carries a stationary knife blade 45 which is preferably of metal and which is of rigid construction and including a durable and sharp cutting surface. Housing 8 includes a beaded slot 47 for mounting the blade 45, with slot 47 being constructed such that blade 45 may be removed therefrom for purposes of replacing therein a fresh blade element. Thus, blade 45 will become dulled over a period of use and beaded slot 47 provides for the ready replacement thereof.

Referring again to FIG. 20, pressure block 29 includes an aperture 49 therein, and a force plate member 51. When it is desired to trim line 26 to a predetermined length prior to beginning a vegetation cutting operation with the device of the present invention, the terminal end of line member 26 is brought upwardly towards assembly 7 and inserted into and through aperture 49. This places the line member 26 between the blade 45 and the force plate 51. Adjustment of the amount of line pulled upwardly through aperture 49 will obviously determine the length which will be trimmed off and hence the length of line 26 remaining after the line trimming operation. Once positioned as above between blade 45 and force plate 51, it is simply necessary to manually push pressure block 29 towards housing 8. Hence, force plate 51 forces line 26 against blade 45 and the line is thereby cut as seen, for example in FIG. 19, with the free cut end portion 26A falling to the ground. The pre-cut section of line 26B is then removed from cutting assembly 7 with the result that the unit may then be used to cut vegetation in the fashion hereinbefore described. For the sake of convenience, the pressure block 29 may be provided with a slanted lower wall 53 to easily accommodate grasping thereof by a thumb and forefinger, for example, in order to lift the block 29 away from the housing 8. It will therefore be apparent that assembly 7, as above described, provides a convenient mechanism for the operator of the device of the present invention to pre-trim the line 26 to size, and eliminates the necessity of the operator of the device to carry upon his person some type of knife or cutting mechanism.

Figure 21:
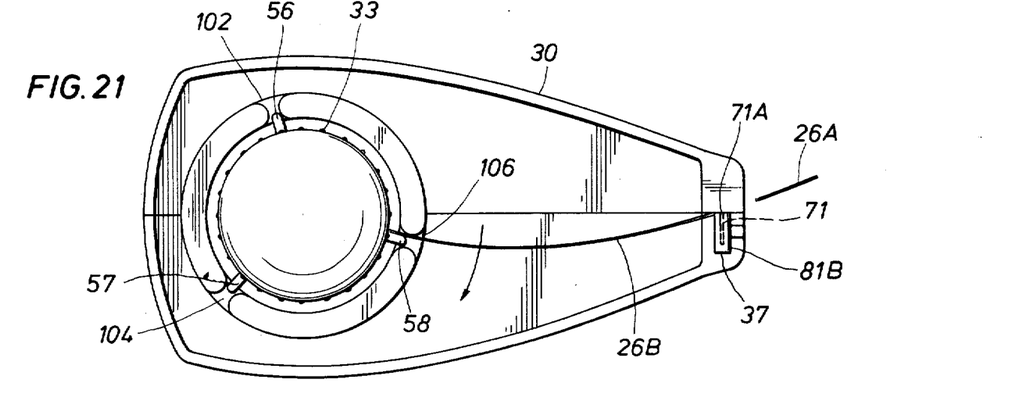
FIG. 21 is a bottom view of the housing of the device depicted in FIG. 2 and showing the details of the second knife member for automatically cutting the line member when the device is in operation.
Figure 22:
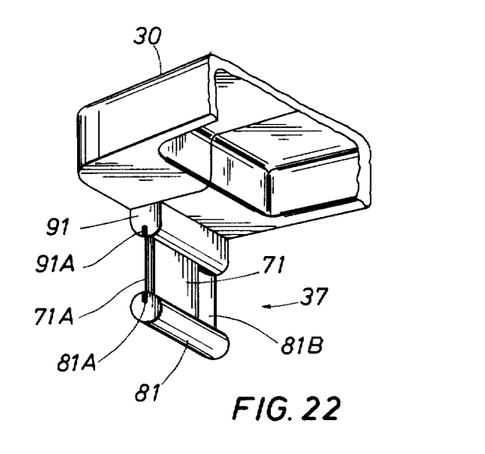
FIG. 22 is a partial isometric view of the details of the automatic knife cutting member depicted in FIGS. 2 and 21.

With reference now to FIGS. 21 and 22, there is therein illustrated and depicted a stationary and automatic cutting assembly 37 for trimming line 26 to size as the head member 42 rotates. Thus, as shown in FIG. 22, interference shield member 30 carries at its underside cutting blade or knife element 71 having a sharp metal cutting surface 71A. Carried integrally with member 30, is a knife mounting assembly indicated by the numerals 81, 81B and 91. The mounting assembly for the knife 71 includes and is seen to comprise, a single downwardly extending and solid wall section 81B having an upper bead portion 91 and a lower bead portion 81. Each of the beads includes therein slots 81A and 91A for removably receiving the blade 71. Thus, it will be apparent that when blade 71 becomes dulled after extended use, it may be easily replaced with a fresh blade by first removing the blade 71 from mounting wall section 81B, by sliding blade 71 out from slots 81A and 91A. The new blade is then inserted in slots 81A and 91A and pushed along the slots until the surface 71A is in alignment with the outer edges of beads 81 and 91 as is clearly depicted in FIG. 22. It should be noted that the blade 71 is supported and braced all along its rearward surface by wall portion 81B, only a portion of which is shown exposed in FIG. 22.

It will be readily apparent, therefore, with the knife 71 mounted as described above, that the cutting surface 71A lies in a plane perpendicular to the path of travel of the line member 26. Thus, as seen in FIG. 21, the line 26 is rotated by head member 42 in a path which must cross the blade surface 71A. As line member 26 is so rotated, it is automatically trimmed to its desired length 26B with the excess portion 26A falling by the wayside. If it is desired to cut vegetation with a line 26B of a length of 5.0 inches for example, it is simply necessary in the construction of this unit to space knife 71 5 inches from the outer periphery of the head member 42. Thereafter, a 5 inch line length 26B will be maintained automatically and regardless of the fact that the line member is 6 inches in length prior to start-up of the apparatus. It is therefore contemplated, that the operator of the device will initially pay out about seven or eight inches of line 26 from head member 42 prior to the initiation of any vegetation cutting operation. The operator may then pre-cut the line 26 to about 6 inches with the knife assembly depicted in FIGS. 18 - 20. Thereupon, and afterwards, the blade assembly 37 of FIGS. 21 and 22 will automatically cut the line 26 to the exact length 26B desired, which according to the preferred mode of operation disclosed herein is about 5.3 inches. Hence, it will be seen that the dual knife assembly of FIGS. 18 - 22 provides a simple and convenient system for cutting the line member 26 to its desired and effective working length and without the necessity of manually measuring the length thereof.

In a preferred embodiment of the present invention, it has been determined that an effective length-to-diameter ratio for a nylon monofilament line 26 or the like, will often be greater than 50:1 and is preferably about 82:1 for present purposes. It has further been found that the best cutting line for the purposes of this invention are extruded nylon line, having a diameter of about 0.060 inches to about 0.125 inches, with 0.065 inches being preferred. The normal rotating speed will be on the order of 6000-7500 RPM, with 7,000 RPM being preferable during normal use of the equipment.

It has been determined that for the embodiments disclosed herein, the optimum parameters call for a cutting length (the length extending beyond the periphery of the cutting head) of substantially 5-9 inches, with a cutting length of about 5.3 inches being preferred. A head diameter of about 4.4 inches is desirable, thus providing a cutting path of about 15.0 inches, although cutting heads of substantially larger or smaller diameters are contemplated herein.

In a more precise relationship, the optimum RPM is preferably stated in terms of tip velocity (since it is the terminal inch of each line that is effective for present purposes), and thus may be stated as follows:

$$V_{max} = \frac{27,000}{\sqrt[16]{d}}$$

or $$V_{max} = \frac{27,000}{d^{0.063}}$$

wherein V is the tip velocity of the cutting line in feet per minute, and $d$ is the cross-sectional diameter in inches of a monofilament extruded nylon line.

Accordingly, if the line 26 has a diameter of 0.080 inches, the maximum velocity should not exceed 32,000 feet per minute. This tip velocity is computed according to the above set forth relationship of $V_{max}$. The following table of the 16th roots of the various cord sizes ($d$) has been found useful in the computations:

| d | $\sqrt[16]{d}$ |
|---|---|
| .010 | .7499 |
| .015 | .7692 |
| .020 | .7832 |
| .025 | .7940 |
| .030 | .8032 |
| .035 | .8110 |
| .040 | .8178 |
| .045 | .8238 |
| .050 | .8293 |
| .055 | .8342 |
| .060 | .8388 |
| .065 | .8430 |
| .070 | .8469 |
| .075 | .8506 |
| .080 | .8540 |
| .085 | .8572 |
| .090 | .8603 |
| .095 | .8631 |
| .100 | .8658 |
| .105 | .8680 |
| .110 | .8711 |
| .115 | .8735 |
| .120 | .8959 |
| .125 | .8782 |
| .130 | .8803 |
| .135 | .8824 |

It should be understood that, regardless of the particular configuration of any of the various forms of the particular invention, the free traveling end of any cutting line will preferably be swung in the cutting plane at a tip velocity such that such end will tend to stand rigidly out from the periphery of the cutting head. Hence, the line end will experience a shock whenever the line end impacts any object in the cutting plane, and also whenever the free traveling end is caused to whip or backlash about the periphery of the cutting head. The magnitude of this shock will, of course, be affected substantially by whether the impacted object is yielding or unyielding, and whether it is severable. Hence, when the cutting line has a tip velocity as hereinbefore prescribed, and when it strikes an unyielding and unseverable object, such as a fence or wall or the like, the resulting shock is sufficiently great to cause breakage if concentrated at one point along the line.

As hereinbefore explained, it is a feature of each of the embodiments of the invention depicted herein to provide that the shock of such impact be distributed as much as possible along the length of the cutting line, since concentration of such shock at any point will greatly enhance the chances that the cutting line will experience fracture or breakage. Accordingly, provision is made whereby the extended portion of the cutting line extends along a path lying only in the cutting plane, and whereby provision is made for distribution of such shock along as great a portion of the cutting line as possible. In particular, provision is made whereby the cutting line does not contact any trailing portion of the cutting head during rotation, and whereby it abuttingly contacts only a leading portion of the head. Thus, if the line strikes an unyielding object the line will at least momentarily be pushed back out of contact with this leading portion of the cutting head, and since the line is momentarily out of contact with any adjacent portion of the apparatus, the shock will tend to be distributed over a greater portion of the length of the impacted cutting line.

If the impact is great enough, or if the impacted object is so unyielding as to cause the line to backlash about the periphery of the cutting head, then the extended portion of the cutting line will then be contacted by one or more trailing surfaces or other portions of the revolving cutting head. The line will then experience a shock while contacting this trailing portion of the cutting head, if the line strikes another object while still deformed. If the contacted trailing portions of the head have a sufficiently large radius of curvature, however, the chances are improved that the shock will be distributed enough to avoid or minimize damage to the line.

If the line is backlashed about the periphery of the cutting head, of course, the line will not then strike any object in the cutting plane except the head itself. The shock from the backlash will, however, often cause line breakage unless provision is made in one or more of the ways hereinbefore discussed, whereby such backlash is about a surface or surfaces having at least a minimum radius of curvature, and whereby the shock of impact is thereby distributed over as much of the length of the line as is possible. In any event, it is exceedingly desirable, if not absolutely essential, that the line not be permitted to experience any angular deformation at any point along its length.

It will thus be apparent, that this invention provides the art with a cutting device which can quickly, easily, and efficiently cut grass, weeds, and the like; over, under, around, and between rocks, culverts, and the like; and can cut around and between trees, posts, bushes, buildings, and other stationary objects, or the like. Further, this apparatus will be particularly safe for both the operator and others in the vicinity, in that the hazardous conditions present when prior art devices are used have been essentially eliminated. By making the apparatus available in a portable embodiment, the cutting plane can be effected in any direction so as to accommodate both cutting and trimming operations as heretofore described, thereby eliminating the need for manual labor in certain difficult cutting operations.

The apparatus of this invention can also be used successfully in yard trimming and cleaning operations where there is considerable debris, such as rocks, stones, bottles, cans, papers, wood, wire and the like, without creating a dangerous condition in that the cutting elements of this device do not create dangerous missiles of such trash. Because of the nature of the cutting element of this invention, such objects are not thrown, but rather the cutting string acts in a resilient fashion, so as not to impart sufficient force to such objects to become missiles; or if they are thrown, they are projected at only a very low velocity as compared with cutting devices heretofore in use. Experience has shown that in operating an apparatus of this device with line of the type described, the cutting line may accidentally come in contact with the operator's shoes, articles of clothing, or the like, without serious injury as would be the case with prior art devices.

It will be apparent from the foregoing that many other variations and modifications may be made in the structures and methods described herein without departing substantially from the essential concept of the present invention. Accordingly, it should be clearly understood that the forms of the invention described herein and depicted in the accompanying drawings are exemplary only and are not intended as limitations in the scope of the present invention.

I claim:

1. Apparatus for cutting vegetation and the like, comprising:
   head means rotatable about an axis in a cutting plane,
   electrically actuated driving means for rotating said head means in said plane,
   a flexible non-metallic line member having a portion coiled within said head means and having an uncoiled portion extending outwardly of the periphery of said head means in said cutting plane,
   a housing supporting and enclosing said driving means,
   handle means attached at one end to said housing and including a switch,
   an electrical harness assembly including a full-wave rectifier connected between said driving means and said switch for actuating said driving means, and
   a cutting blade associated with said housing and spaced from said axis in said cutting plane for trimming said line to a predetermined length upon actuation of said driving means.

2. The apparatus described in claim 1 wherein a portion of said housing extends outwardly from said axis and spaced from and substantially parallel to said cutting plane, and wherein said blade is mounted on the underside of said housing portion.

3. The apparatus described in claim 2 including means on the underside of said housing portion for removably and insertably mounting said blade.

4. The apparatus described in claim 3 wherein said blade includes a cutting surface arranged substantially perpendicularly to the path of travel of said line member in said cutting plane.

5. The apparatus described in claim 4 wherein said mounting means includes a downwardly extending and solid wall section of said housing portion having a pair of slots therein for removably inserting said blade .

6. Apparatus for cutting vegetation and the like, comprising:
   head means rotatable about an axis in a cutting plane,
   electrically actuated driving means for rotating said head means in said plane,
   a flexible non-metallic line member having a portion coiled within said head means and having an uncoiled portion extending outwardly of the periphery of said head means in said cutting plane,
   a housing supporting and enclosing said driving means,
   handle means attached at one end to said housing and including a switch,
   an electrical harness assembly including a full-wave rectifier connected between said driving means and said switch for actuating said driving means,
   a cutting blade associated with said housing and spaced from said axis and located above said cutting plane, and
   force applying means associated with said blade for cutting said line member when said line member is passed between said blade and said force applying means.

7. The apparatus described in claim 6 including a pressure block mounted to said housing, said force applying means being housed within and carried by said pressure block including an aperture therein for passing said line member therethrough.

8. The apparatus described in claim 7 including means for pivotally mounting said pressure block to said housing, and wherein said blade is positioned on said housing at a location spaced below said mounting means.

9. The apparatus described in claim 8 wherein said aperture is located in the upper portion of said pressure block adjacent said mounting means.

10. Apparatus for cutting vegetation and the like, comprising:
    head means rotatable about an axis in a cutting plane,
    electrically actuated driving means for rotating said head means in said plane,
    a flexible non-metallic line member having a portion coiled within said head means and having an uncoiled portion extending outwardly of the periphery of said head means in said cutting plane,
    a housing supporting and enclosing said driving means,
    handle means attached at one end to said housing and including a switch,
    an electrical harness assembly including a full-wave rectifier connected between said driving means and said switch for actuating said driving means,
    a first cutting blade associated with said housing and spaced from said axis in said cutting plane for trimming said line to a predetermined length upon activation of said driving means,
    a second cutting blade associated with said housing and spaced from said axis and located above said cutting plane, and
    force applying means associated with said second blade for cutting said line member to a predetermined length when said line member is passed between said second blade and said force applying means.

11. The apparatus described in claim 10 wherein a portion of said housing extends outwardly from said axis and spaced from and substantially parallel to said cutting plane, and wherein said first blade is mounted on the underside of said housing portion.

12. The apparatus described in claim 11 including means on the underside of said housing portion for removably and insertably mounting said first blade.

13. The apparatus described in claim 12 wherein said first blade includes a cutting surface arranged substantially perpendicularly to the path of travel of said line member in said cutting plane.

14. The apparatus described in claim 13 wherein said mounting means for said first blade includes a downwardly extending and solid wall section of said housing portion having therein a pair of slots for removably inserting said first blade.

15. The apparatus described in claim 10 including a pressure block mounted to said housing, said force applying means being housed within and carried by said pressure block, and said pressure block including an aperture therein for passing said line member therethrough.

16. The apparatus described in claim 15 including means for pivotally mounting said pressure block to said housing, and wherein said second blade is positioned on said housing at a location spaced below said mounting means.

17. The apparatus described in claim 16 wherein said aperture is located in the upper portion of said pressure block adjacent said mounting means.

18. As a subcombination, a vegetation trimmer assembly and the like, comprising:
a length of non-metallic flexible cord,
rotatable support means for revolving said cord about an axis and in a cutting plane,
motor means for rotating said support means,
housing means supporting and enclosing said motor means,
a first cutting blade associated with said housing means and spaced from said axis in said cutting plane,
a second cutting blade associated with said housing means and spaced from said axis and located above said cutting plane, and
force applying means associated with said second blade.

19. The apparatus described in claim 18 wherein a portion of said housing means extends outwardly from said axis and spaced from and substantially parallel to said cutting plane, and wherein said first blade is mounted on the underside of said housing portion.

20. The apparatus described in claim 19 including means on the underside of said housing portion for removably and insertably mounting said first blade.

21. The apparatus described in claim 20 wherein said first blade includes a cutting surface arranged substantially perpendicularly to the path of travel of said cord in said cutting plane.

22. The apparatus described in claim 21 wherein said mounting means includes a downwardly extending and solid wall section of said housing portion having a pair of slots therein for removably inserting said first blade.

23. The apparatus described in claim 18 including a pressure block mounted to said housing means, said force applying means being housed within and carried by said pressure block, and said pressure block including an aperture therein for passing said core therethrough.

24. The apparatus described in claim 23 including means for pivotally mounting said pressure block to said housing and wherein said second blade is positioned on said housing at a location spaced below said mounting means.

25. The apparatus described in claim 24 wherein said aperture is located in the upper portion of said pressure block adjacent said mounting means.

* * * * *